United States Patent

[11] 3,598,017

| [72] | Inventor | Oliver E. Saari<br>Niles, Ill. |
|---|---|---|
| [21] | Appl. No. | 805,523 |
| [22] | Filed | Mar. 10, 1969 |
| [45] | Patented | Aug. 10, 1971 |
| [73] | Assignee | Stanray Corporation<br>Chicago, Ill. |

[54] WHEEL TRUING MACHINE
8 Claims, 6 Drawing Figs.

[52] U.S. Cl. ..................................... 90/20,
90/15, 82/8, 51/104
[51] Int. Cl. ..................................... B23c 1/14,
B24b 5/46
[50] Field of Search............................ 90/20, 16,
11, 15; 82/8, 4.5; 51/104, 106; 11/11

[56] References Cited
UNITED STATES PATENTS

| 2,605,591 | 8/1952 | Hill.............................. | 51/104 |
| 2,677,307 | 5/1954 | Bloss............................ | 90/20 X |
| 3,455,065 | 7/1969 | Shiomi et al.................. | 51/104 |
| 2,645,003 | 7/1953 | Thompson et al. ........... | 29/105 |

*Primary Examiner*—Gil Weidenfeld
*Attorney*—Sabin C. Bronson

ABSTRACT: Apparatus for truing the wheels of a railway vehicle wheel-and -axle assembly. The vehicle axle is maintained in a fixed alignment by means of retractable centers, and the truing tool rotates about an axis which is maintained parallel to the vehicle axle. Drive rollers are provided to support and drive the vehicle wheels. The drive rollers are carried by a platform mounted for limited universal movement on a hydraulic lift mechanism which supports the weight on the vehicle wheels. Resilient means are provided to damp the universal motion of the platform. The truing tool is a milling cutter having a body contoured to the shape of the vehicle wheel, with cylindrical cutting buttons affixed to the body in diagonal ranks to form a helical pattern. The buttons in the wheel flange cutting portion of the cutter body are disposed with their longitudinal axes substantially normal to a radius of the cutter body, while the buttons in the tread cutting portion are disposed with their longitudinal axes substantially coincident with a radius of the cutter body. The flange cutting buttons may be arranged in ranks which are offset from the ranks containing the tread cutting buttons, and next adjacent buttons in the helical pattern may be spaced by staggering the ranks.

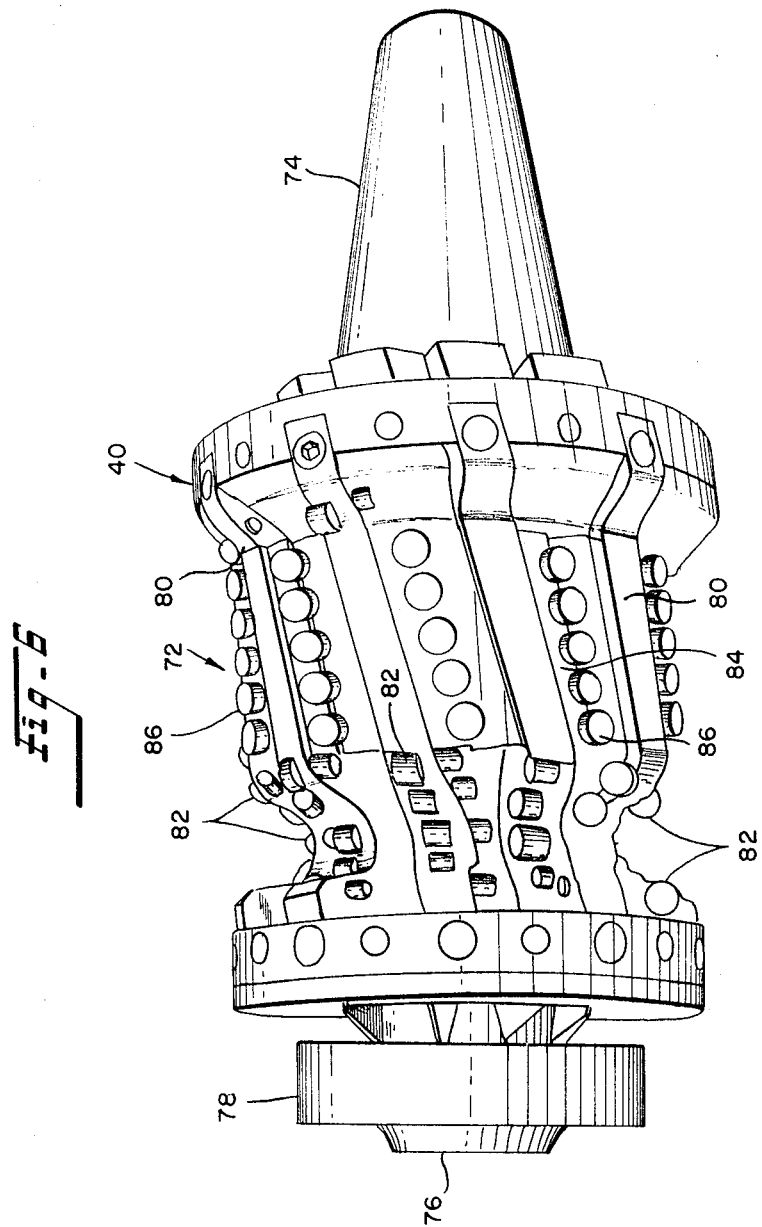

3,598,017

WHEEL TRUING MACHINE

BACKGROUND—SUMMARY—DRAWINGS

This invention relates to wheel truing apparatus and, more particularly, to a system for restoring proper contour and concentricity to the flanged wheels of railway vehicle wheel-and-axle assemblies.

In wheel truing machines of the type which employ rotary tools, such as grinding wheels or milling cutters, it is essential to maintain the axis of rotation of the vehicle wheels (i.e., the axle) parallel to and at a fixed distance from the axis of rotation of the truing tool. Only in this manner will the finished vehicle wheels be truly concentric with the vehicle axle upon which they are mounted. Maintenance of this parallel relationship is difficult, however, inasmuch as the worn vehicle wheels are non concentric and have irregular surfaces, and thus have a tendency to cause the vehicle axle to "float" as the wheels rotate during the truing operation.

One common type of prior truing machine has approached this problem by providing a rigid support for the vehicle wheels and allowing the remainder of the apparatus, including the tool system and the axle centering system to 37 float" with the vehicle axle. This approach, however, requires that much of the apparatus be suspended, necessitating the use of massive castings and complicated hydraulic or other suspension gear.

The present invention overcomes the drawbacks of such prior machines by providing rigidly supported centering and tool systems and a resilient support system for the vehicle wheels. Thus the wheel support system itself is permitted to "float" with the eccentricities in the vehicle wheels, while the rigid axle centering and tool systems serve to maintain constant alignment between the axle and the axis of rotation of the rotary tool.

To achieve this "floating support" concept the present invention provides, as one of its principal structural features, a platform or beam member mounted for limited universal movement on a lifting device. The lifting device, which is preferably a hydraulic jack coupled to a hydraulic-pneumatic accumulator, supports the weight on the wheels so that the force exerted is constant. The platform carries drive rollers or wheels which support and drive the vehicle wheels. Resilient means, such as pneumatic cylinders, are provided to damp or limit the back to back and side to side motion of the platform. Thus the vehicle wheels, and the weight of the vehicle itself, are resiliently supported by a system which can float with eccentricities in the wheel, while the axle of the vehicle is held in a fixed alignment with the truing tool.

The truing tool is preferably a milling cutter of generally circular cross section having a helical array of cylindrical cutter buttons mounted thereon. A typical prior cutter of this type is disclosed and claimed in U.S. Pat. No. 2,645,003, issued July 14, 1953 and owned by my assignee. Such a cutter generally comprises a body shaped to conform to the contour of the wheel to be trued, i.e., having a substantially flat tread portion and an arcuate flange portion. The cutter buttons are disposed with their longitudinal axes perpendicular to a radius of the body and are arranged in a number of diagonal ranks so as to form a helical or screwlike array about the surface of the cutter body.

Although such prior cutters have provided adequate performance, it has been discovered that certain modifications therein enhance the performance and result in increased tool life. Accordingly, the present invention includes as another of its principal structural features an improved cutter wherein the cylindrical buttons in the tread cutting portion of the cutter body are rotated approximately 90° so that their longitudinal axes substantially coincide with the radii of the body. Further, the buttons in the tread cutting portion may be arranged in ranks which are offset from the ranks containing the flange cutting buttons. Additionally, the spacing of the buttons within each rank may be such that the next adjacent button to a reference button in the helical pattern lies in a rank which is not the next adjacent rank to that containing the reference button. These features result in a decrease of chip thickness for equal chip volume, a lighter chip load for an equal depth of cut, a more uniform distribution of cutting load, and generally smoother machining, as well as the above mentioned benefits of increased tool life and efficiency.

The foregoing and additional advantages and features of the invention will be more fully appreciated from a consideration of the following detailed description, with illustrative reference to the drawings, in which:

FIG. 6 is a perspective view of the cutter utilized in this invention.

Figure 1:
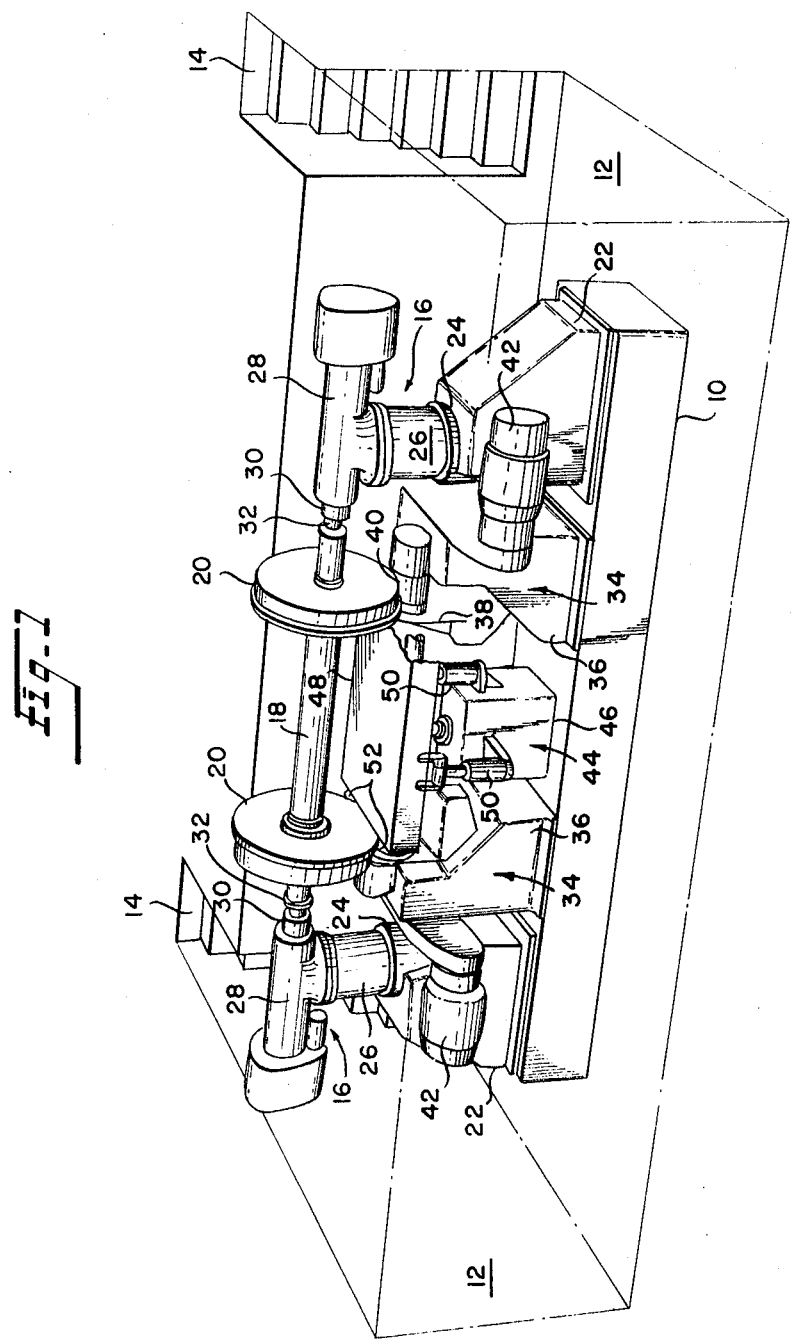
FIG. 1 is a perspective view of exemplary wheel truing apparatus constructed in accordance with the invention.
Figure 2:
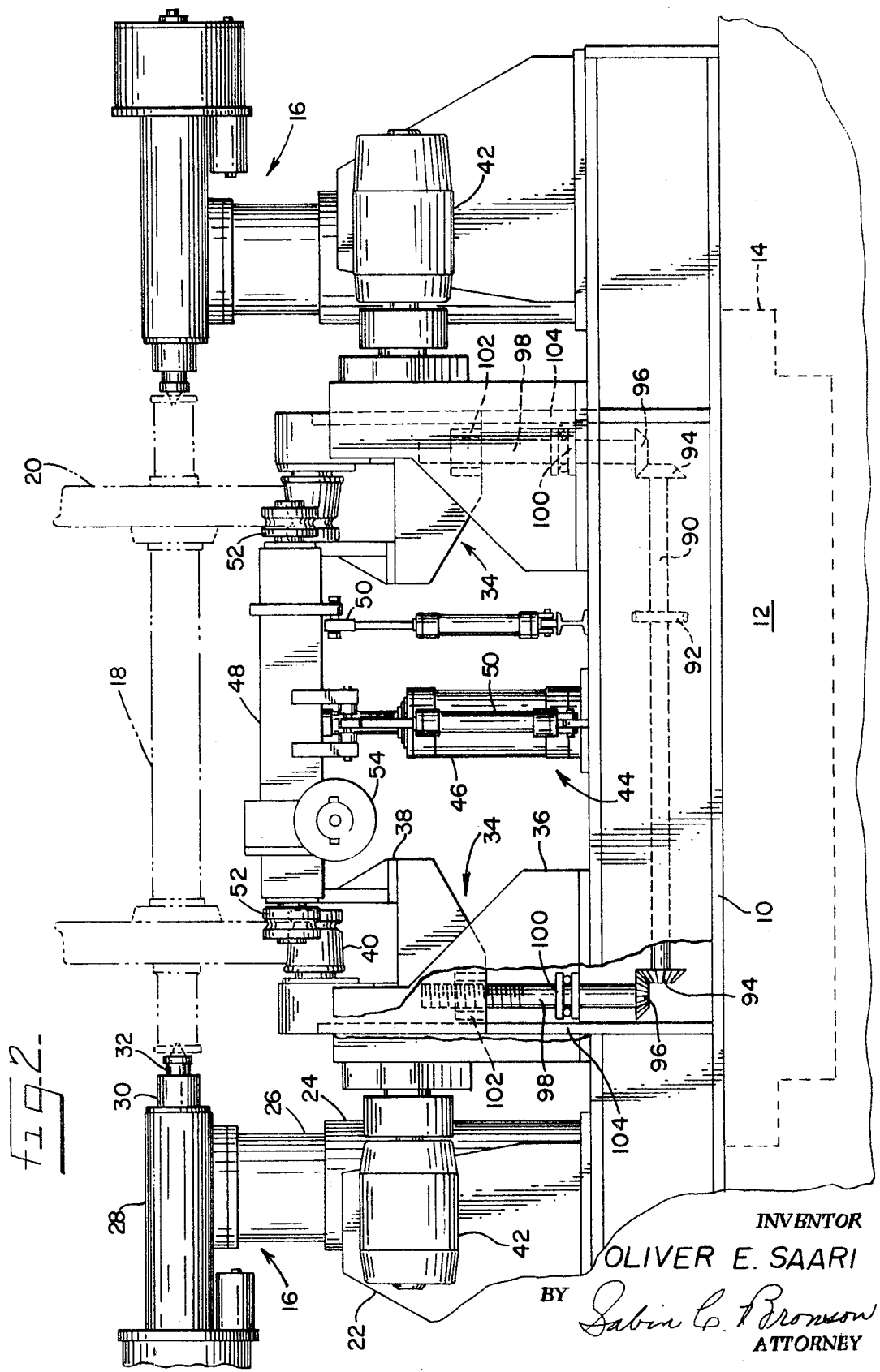
FIG. 2 is a front elevation thereof.
Figure 3:
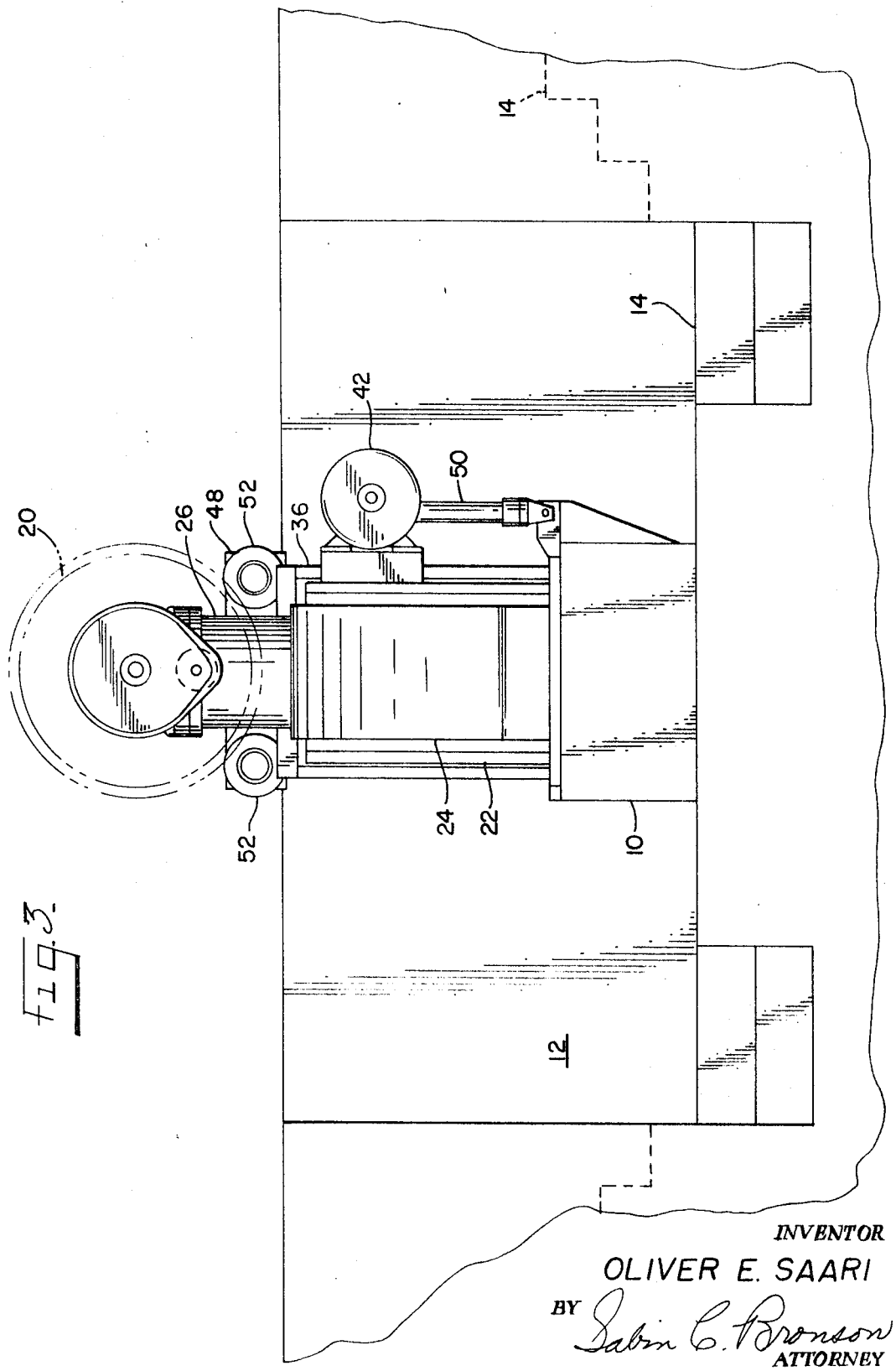
FIG. 3 is a side elevation thereof.

With reference to the drawings, and particularly FIGS. 1 through 3, there is shown an exemplary construction of a wheel truing apparatus which embodies the present invention. FIG. 1 is a perspective view of the exemplary apparatus which includes a main base structure 10 resting in a truing pit 12. The pit 12 includes stairways 14 for easy access to the apparatus.

Mounted on the base 10 are a pair of center assemblies 16 which serve to maintain the vehicle axle in proper alignment during the truing operation. For purposes of illustration, a wheel-and-axle assembly, comprising an axle 18 and a pair of wheels 20, is shown held in position on the truing apparatus by the center assemblies 16.

Each of the center assemblies 16 includes a main body structure 22 defining a hydraulic elevator cylinder 24. Mounted for vertical movement in the elevator cylinder 24 is a piston 26 which in turn carries a hydraulic retractor cylinder 28. Disposed for horizontal movement in the retractor cylinder 28 is a second piston 30 which carries a center 32. The centers 32 contact the ends of the vehicle axle 18 and thus hold the axle in a fixed alignment relative to the base 10 during the truing operation. The centers 32 are moved in and out horizontally and up and down vertically by operation of the retractor cylinders 28 and the elevator cylinders 24, respectively.

Also carried by the base 10 are a pair of tool assemblies 34. Each of the tool assemblies 34 includes a main body member 36 and a tool support structure 38. Mounted in conjunction with the tool support structure 38 is a rotatable milling cutter 40, the construction of which will be described in greater detail hereinafter. A pair of drive motors 42, shown mounted on the center body structures 22, are provided to rotate each of the milling cutters 40 during the truing operation. The body member 36 and the tool support structure 38 serve to hold the axis of rotation of the milling cutter 40 parallel to the vehicle axle 18 during the truing operation, thus insuring that the finished wheels 20 are truly concentric with respect to the axle.

Suitable tool-positioning or elevator mechanisms may be provided in conjunction with the tool assemblies 34 to guide the cutters 40 vertically into the work i.e., the wheels 20, to achieve the desired depth of cut. One conventional way of elevating the cutters 40 vertically into contact with the wheels 20 is illustrated in Fig. 2, wherein a drive shaft 90 is disposed in the main base structure 10. Shaft 90 has a suitable pulley or gear 92 mounted thereon to receive power means not shown to drive the shaft when needed. The ends of the shaft are disposed under the tool assemblies 34 and are provided with beveled gears 94 which mesh with like beveled gears 96 mounted on the ends of vertical shafts 98 extending through bearings 100 mounted within the body member 36 of the tool assemblies 34. The upper portions of the shafts 98 are threaded and screw-threadedly extend through the nut like bearings 102 fixed within the tool support structure 38. The back of the tool assembly is provided with a splined joint 104 so that the tool support structure may slide in said joint and be raised or lowered vertically by rotating the shafts 98 one way or the other in the nut bearing 102. By such a conventional means, the cutters may be elevated up to the wheels 20 when the wheel and axle assembly 18 is positioned on the cradle rollers 52–52 for truing same. Alternatively, the wheels 20 may be lowered onto the cutters 40 by simultaneous manipulation of the center assemblies 16 and a wheel support assembly 44, as described in greater detail hereinafter.

Also mounted on the base 10 is the wheel support assembly 44 which includes a lift jack 46 and a beam member or platform 48 mounted for limited universal movement on the lift jack. A plurality of resilient supporting devices 50 are provided to damp the universal side to side or front to back movement of the platform 48. Carried by the platform 48 are a plurality of drive wheels or rollers 52 which serve to support and drive the vehicle wheels 20. As best shown in FIG. 2, the platform 48 also carries a drive motor 54 and suitable shafting for providing rotational force for the rollers 52.

The drive rollers 52, of which there are preferably two for each of the vehicle wheels 20, are designed to support substantially the entire weight of the wheel-and-axle assembly and the vehicle, if any, upon which the assembly is mounted. The rollers 52 also serve to rotate the vehicle wheels 20 slowly about the axle 18, thus feeding the wheels into the cutters 40. In this manner, in conjunction with the improved tool which forms a part of the present invention, the truing operation may be satisfactorily completed with a single revolution of the vehicle wheels 20. In order to compensate for differences in vehicle wheel rotational speed, the rollers 52 may be linked by a suitable differential mechanism also carried by the platform 48.

Figure 4:
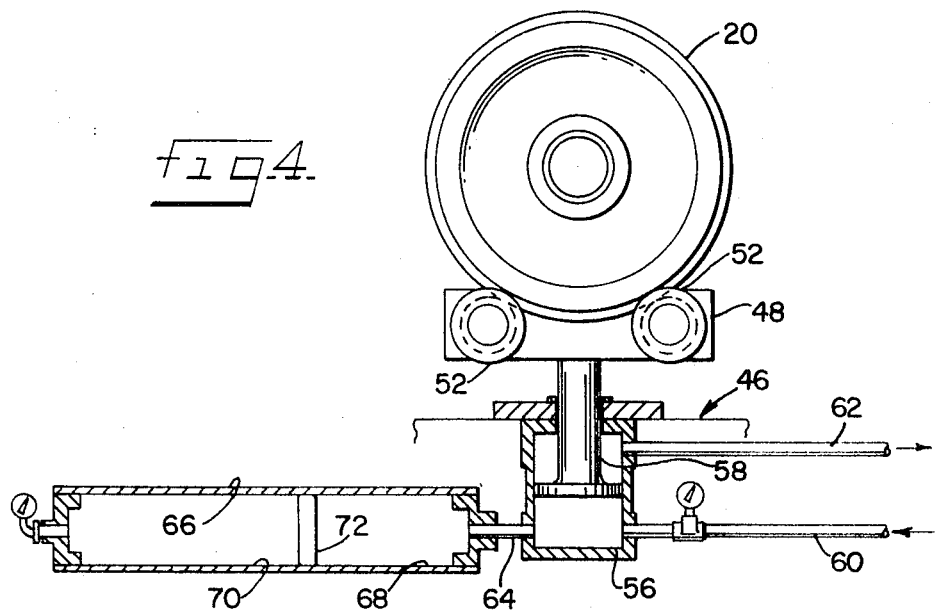
FIG. 4 is a side sectional elevation, partially enlarged, of a portion of the apparatus.
Figure 5:
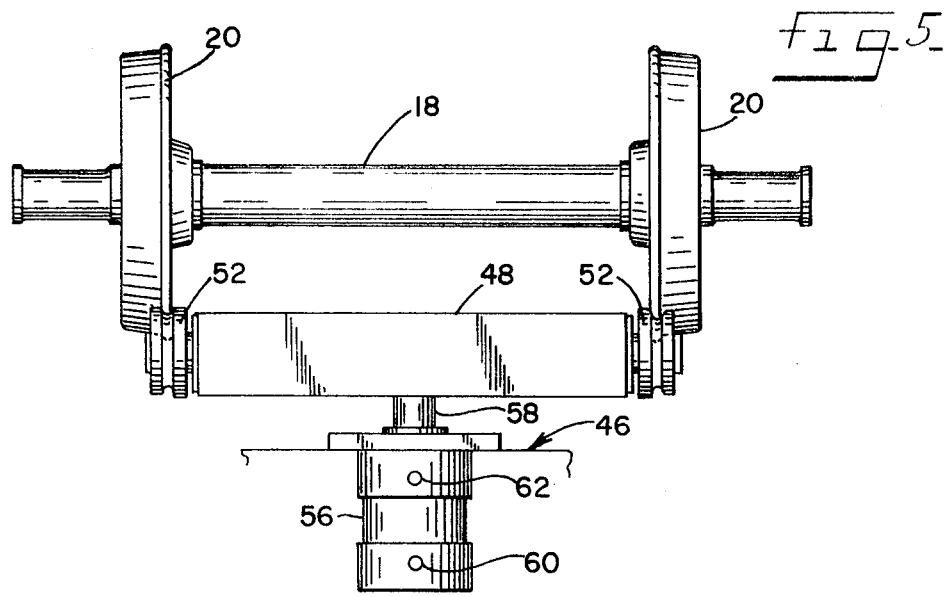
FIG. 5 is a front elevation thereof.

FIGS. 4 and 5 depict the arrangement of the lift jack 46 in somewhat greater detail. As shown therein, the jack 46 includes a hydraulic cylinder 56 fitted with a piston 58. The platform 48 is attached to the upper end of the piston 58 by means of a suitable universal connection, such as a ball and socket joint. Thus the platform 48 is free for limited movement from side to side and from front to back. A hydraulic supply line 60 and an exhaust line 62 lead from a suitable pump or motor (not shown) into the cylinder 56, thus providing lifting force for the jack 46. Referring now to Fig. 6, the cutter 40 includes a central body 72 with an arbor portion 74 at one end adapted to fit into and be held by a conventional chuck of a milling or truing machine suitable for truing car or locomotive wheels in situ. At the other end of the body 72 a shaft 76 extends outwardly and supports a bearing 78 thereon. Cutter 40 is generally cylindrical in shape and generally circular at any transverse cross section thereof. The cutter shown has a peripheral contour which conforms to the tread, flange and chamfer portions of a railroad car or locomotive wheel, and may be of a shape to conform to the articulation of any work piece that can be milled by a rotary cutter.

Attached to the body portion 72 by screws or other suitable means are a number of flange cutting blades 80, each having a plurality of generally cylindrical cutter buttons 82 mounted thereon around the flange cutting area of the blade. These buttons, because of space limitations, are located with their axes generally perpendicular to a radii of the cutter body. The central or tread cutting blades 84 are circumferentially offset or staggered between the blades 80 and support thereon a plurality of spaced cutter buttons 86 disposed with their axes substantially coincident with radii of the cutter body.

It is obvious that the blades 80 and 84 are disposed in diagonal slots in the cutter body. Recesses are formed in the blades to accommodate the buttons 82 and 86.

The specific cutter head is disclosed and claimed in my copending application Ser. No. 795,781, filed Jan. 30, 1969, now Pat. No. 3,540,103 and is not specifically claimed herein. Reference may be had to my said copending application for a more complete description of the cutter head, the cutter blades, the cutter buttons and the manner of fastening same to the cutter body.

Attached to the cylinder 56 through a branch line 64 is a hydraulic pneumatic accumulator 66 which is divided into a hydraulic compartment 68 and a pneumatic compartment 70 by means of a free piston 72. The accumulator 66 serves to support the weight on the vehicle wheels so that the force exerted upon the drive rollers 52 is constant.

In the operation of the depicted wheel truing apparatus, a wheel-and-axle assembly, which may or may not be attached to a railway vehicle, is moved into position over the pit 12. This is normally accomplished by means of retractable railroad tracks or other well known expedients. With the wheel-and-axle assembly in place, the platform 48 is then raised by operation of the lift jack 46 until the drive rollers 52 contact the vehicle wheels 20. Further upward movement of the platform 48 results in the full weight of the wheel-and-axle assembly being supported by the rollers 52. It may be assumed that if the wheel-and-axle assembly is attached to a railway vehicle, similar such assemblies will likewise be supported simultaneously by truing machines, or otherwise held stationary by suitable means. In any event, depending upon the weight exerted on the rollers 52, it may be necessary to employ an auxiliary holddown device as is well known in the art, in order to avoid undue upward stress upon the centering assemblies 16 during the actual cutting operation.

Once the vehicle wheels 20 are properly supported on the rollers 52, the centers 32 are inserted into the ends of the vehicle axle 18 by actuation of the elevator and retractor cylinders 24 and 28 of the centering assemblies 16. The axle 18 is now held in firm parallel alignment with the rotational axis of the milling cutters 40, and the cutting operation is ready to proceed.

The cutting operation is commenced by bringing the cutters 40 into contact with the wheels 20 and removing metal until the desired depth of cut is achieved. As indicated previously, this may be accomplished by elevating the cutters 40 vertically into the wheels 20, or by lowering the wheels through simultaneous manipulation of the elevator cylinders 24 and the lift jack 46.

When the desired depth of cut is achieved, the rollers 52 are actuated to turn the wheels 20 slowly about the axle 18, thus feeding the work into the cutters 40. When the wheels 20 have made one complete revolution, the truing operation is completed, and the cutters 40 are disengaged, the centers 32 retracted, and a new wheel-and-axle assembly moved into position for truing.

Because the centering assemblies 16 and tool assemblies 34 are fixed with respect to the base 10, the axle 18 is maintained in alignment with the axis of the cutters 40, thus ensuring that the finished wheels 20 are truly concentric about the axle. Moreover, since substantially the entire weight of the wheel-and-axle assembly is supported by the rollers 52, essentially the only forces felt by the centers 32 are due to machining stresses. Finally, the forces which would normally tend to cause the axle 18 to "float" (i.e., those forces due to eccentricities of the rotating vehicle wheels 20) are resiliently absorbed by the support assembly 44 in the manner described below.

As the wheels 20 slowly rotate during the truing cut, eccentricities in each wheel and differences between the two wheels result in varying forces on the rollers 52. However, because the platform 48 is universally mounted upon the piston 58 of the lift jack 46, the platform is permitted to "rock" in response to these forces, and acts as a balance beam. The damping devices 50 serve to provide resiliency, and result in positive contact between the rollers 52 and the wheels 20 at all times.

Additional system resiliency is provided by the hydraulic-pneumatic accumulator 66 in conjunction with the hydraulic cylinder 56 of the lift jack 46. As metal is machined from the wheels 20 during the truing cut, the accumulator 66 maintains the upward force exerted by the lift jack 46 at a nearly constant level; moreover, the accumulator provides a resilient response to net downward force increases exerted on the jack by the wheels 20.

Thus the support assembly 44 provides a "floating" support for the wheel-and-axle assembly, while the vehicle axle 18 is rigidly held between the centers 32 and feels forces essentially due only to machining. This "floating" support function could be achieved by counterweights, springs, magnetic, pneumatic or hydraulic devices and other suitable means, but the disclosed hydraulic-pneumatic system has been found preferable for use with relatively massive apparatus of the type herein described. The damping devices 50 are preferably pneumatic cylinders, but might also be springs or other resilient means.

Although the embodiments constructed in accordance with the present invention have been described with requisite particularity, the disclosure is of course exemplary. Changes in details of construction, in size, configuration and arrangement of components and materials, and in modes of application will be apparent to those versed in the art and may be resorted to without departing from the scope of the invention as set forth in the following claims.

I claim:

1. Apparatus for truing the wheels of a railway vehicle wheel-and-axle assembly comprising: a main base; center support means carried by said base; retractable center means carried by said center support means for maintaining said vehicle axle in a fixed alignment relative to said base; lift means carried by said base; a beam member mounted for limited universal movement upon said lift means; roller means carried by said beam member for supporting and driving said vehicle wheels; rotatable cutter means having a common axis of rotation and adapted for engagement with said vehicle wheels; tool support means carried by said base for supporting said cutter means; said tool support means including means for adjustably positioning said cutter means and for maintaining the axis of rotation thereof in parallel alignment with and at a fixed distance from said vehicle axle; and means for selectively elevating said centering means, whereby said wheels can be lowered to engage said cutter means for machining said wheels concentric with respect 2. Apparatus in accordance with claim 1 wherein said lift means is resiliently responsive to changes in the load exerted upon said roller means.

3. Apparatus in accordance with claim 2, wherein said lift means comprises a hydraulic cylinder coupled to a hydraulic-pneumatic accumulator.

4. Apparatus in accordance with claim 1 including resilient means for damping the universal movement of said beam member.

5. Apparatus in accordance with claim 1 wherein said cutter means comprises a body of substantially circular cross section and a plurality of cutter buttons rigidly associated with the surface of said body, said buttons being arranged in a plurality of spaced ranks to establish a helical array of said buttons about the surface of said body, said buttons being spaced within said ranks such that buttons which are adjacent in said helical array lie in non adjacent ranks.

6. Apparatus in accordance with claim 1 wherein said cutter means comprises a body of substantially circular cross section and a plurality of cutter buttons arranged in spaced diagonal ranks about the surface of said body, said buttons being spaced within said ranks such that adjacent increments of cut are taken by buttons lying in non adjacent ranks.

7. Apparatus in accordance with claim 1 wherein said cutter means comprises a body of substantially circular cross section and a plurality of cutter buttons arranged in diagonal ranks on the surface of said body; the surface of said body being substantially congruent with the contour of said wheel and having a flange-cutting portion, a tread cutting portion and a chamfer-cutting portion; the longitudinal axes of at least those buttons lying in said tread-cutting portion being disposed within 10° of coincidence with radii of said body.

8. Apparatus in accordance with claim 1 wherein said cutter means comprises a body of substantially circular cross section and a plurality of cutter buttons arranged in diagonal ranks on the surface of said body; the surface of said body being substantially congruent with the contour of said wheel and having a flange-cutting portion, a tread-cutting portion and a chamfer-cutting portion; the buttons in said tread-cutting portion lying ranks which are circumferentially staggered from the ranks containing the buttons in said flange-and chamfer-cutting portions.

UNITED STATES PATENT OFFICE
CERTIFICATE OF CORRECTION

Patent No. 3,598,017            Dated August 10, 1971

Inventor(s) Oliver E. Saari

It is certified that error appears in the above-identified patent and that said Letters Patent are hereby corrected as shown below:

Column 1, line 24, change "37" to a quotation (") mark

Claim 1, last line after "respect" insert " to said axle".

Claim 8, line 39, after "lying" insert in.

Signed and sealed this 25th day of January 1972.

(SEAL)
Attest:

EDWARD M. FLETCHER, JR.
Attesting Officer

ROBERT GOTTSCHALK
Commissioner of Patents